United States Patent [19]

Kojima et al.

[11] Patent Number: 4,564,261
[45] Date of Patent: Jan. 14, 1986

[54] BUNDLE OF OPTICAL FIBERS

[75] Inventors: Tosaku Kojima; Kunio Matsumoto; Yoshihisa Suzuki, all of Yokohama, Japan

[73] Assignee: Hitachi, Ltd., Tokyo, Japan

[21] Appl. No.: 485,039

[22] Filed: Apr. 14, 1983

[51] Int. Cl.⁴ .............................................. G02B 5/16
[52] U.S. Cl. .................... 350/96.24; 350/96.23
[58] Field of Search ................ 350/96.1, 0.22, 0.24, 350/0.26, 0.28, 0.29; 250/227

[56] References Cited

U.S. PATENT DOCUMENTS 3,216,807  11/1965  Woodcock ..................... 350/96.24
3,356,854  12/1967  Humphrey ......................... 250/227
4,418,984  12/1983  Wysocki et al. .................. 250/227

Primary Examiner—John Lee
Assistant Examiner—Lester Rushin
Attorney, Agent, or Firm—Antonelli, Terry & Wands

[57] ABSTRACT

A bundle of optical fibers is disclosed in which optical fibers each provided with a cladding layer are stacked tier upon tier in a close-packed hexagonal structure and the ratio of a radius of the core of each optical fiber to a radius of the optical fiber including the cladding layer ranges from 0.55 to 0.65.

14 Claims, 15 Drawing Figures $$Y = 2\int_{-R_0}^{X} \sqrt{R_0^2 - x^2} \, dx$$

$$0 \leq X \leq R_0$$

$R_0 = 1$ CONSTANT

DISPLACEMENT X

BUNDLE OF OPTICAL FIBERS

BACKGROUND OF THE INVENTION

The present invention relates to a bundle of optical fibers used as optical sensors for measuring the displacement of an edge of a body having the form of a sheet or belt and the width of the body, or detecting an image of the body.

As shown in FIG. 1, in a conventional method (U.S. Pat. No. 3,089,484) of measuring with a high dimensional accuracy the running characteristic of a body having a long strip shape such as a magnetic tape, light rays emitted from a light source 1 are changed by a lens 2 into parallel rays to pass through a single optical fiber 3 for producing incident light, the incident light is received by and passes through a single optical fiber 4, to be converted into a voltage by a photoconductive element 6 and an electric circuit (not shown), and thus the displacement or movement of a strip-shaped body 5 interposed between the optical fibers 3 and 4, that is, placed in an aperture portion of such a sensor can be detected. FIG. 2a shows the light receiving surface of the optical fiber 4 having a circular cross section and a coordinate system. Now, let us express the radius of the optical fiber, the displacement of the body 5 at the aperture portion of the sensor, and the light output of the sensor corresponding to the displacement by $R_o$, X, and Y, respectively. When the light incident upon the optical fiber 4 is uniformly received by the photoconductive element 6 without any loss, the light output Y in a range of displacement $-R_o \leq X \leq R_o$ is given by the following formula:

$$Y \propto 2 \int_{-R_o}^{X} \sqrt{R_o^2 - x^2}\, dx \qquad (1)$$

By performing the above-mentioned integral calculation, the light output Y is expressed as follows:

$$Y \propto R_o^2 \left\{ \frac{\pi}{2} + \sin^{-1}\left(\frac{X}{R_o}\right) + \frac{X}{R_o}\sqrt{1 - \left(\frac{X}{R_o}\right)^2} \right\} \qquad (2)$$

Accordingly, when the value of the radius $R_o$ is taken as 1, a relation between the displacement X and light output Y such as shown in FIG. 2b is obtained. It is known from FIG. 2b that the light output varies non-linearly with the displacement. That is, the conventional method has a problem that a non-linear relation exists between the displacement of a measured body and the light output of the sensor.

SUMMARY OF THE INVENTION

An object of the present invention is to provide a bundle of optical fibers which can solve the above-mentioned problem of the prior art and can produce a light output varying linearly with the displacement of a measured body.

In order to attain the above object, according to one feature of the present invention, optical fibers each provided with a cladding layer namely, a coating layer, are stacked tier upon tier in close-packed hexagonal structure and a core radius to outer radius ratio K preferably ranges from 0.55 to 0.65 shown in FIG. 8b in order to make a light output from the optical fibers substantially proportional to the displacement of a measured body.

The core radius ratio K means a ratio of a core radius R to a radius $R_o$ of an optical fiber made up of the fiber core and the cladding layer.

BRIEF DESCRIPTION OF THE DRAWINGS

FIG. 10a shows a general structure of the device, in which five multifibers each having a rectangular cross section are closely juxtaposed to each other, four light receiving elements A, B, C and D are coupled with these mutlifibers, and an edge of the measured body is placed in front of the multifibers;

FIG. 10b shows relations between the displacement of the measured body and the light output detected by each light receiving element; and FIG. 10c shows the dependence of a difference between the outputs of the light receiving elements B and A on the displacement of the measured body and the dependence of a difference between the outputs of the light receiving elements D and C on the displacement of the measured body.

DESCRIPTION OF THE PREFERRED EMBODIMENTS

Figure 1:
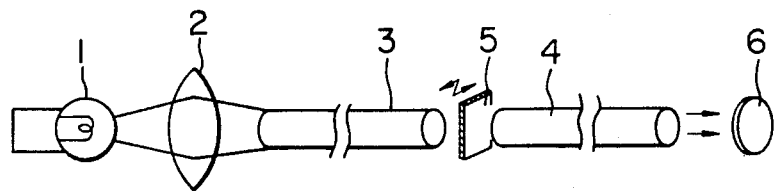
FIG. 1 is a schematic view showing a general structure of a conventional device for detecting the displacement of a measured body by means of a single optical fiber.
Figure 2A:
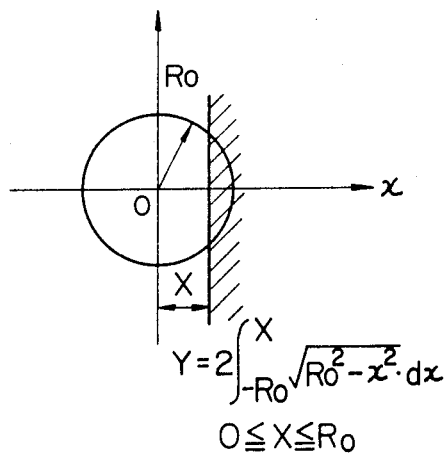
FIG. 2a shows a positional relation in the device shown in FIG. 1 between the light receiving surface of the optical fiber and an edge of the measured body.
Figure 2B:
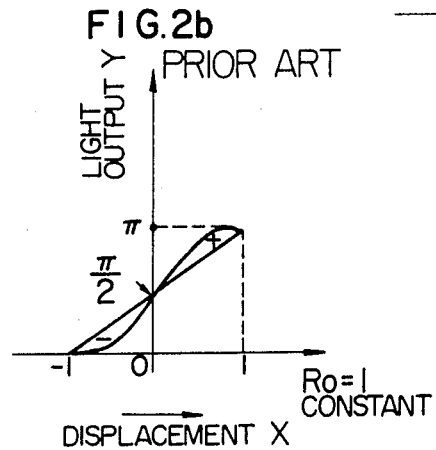
FIG. 2b shows a relation in the device shown in FIG. 1 between the light output from the optical fiber and the displacement of the measured body.

Now, the present invention will be explained below in detail, on the basis of embodiments thereof shown in the drawings.

Figure 3:
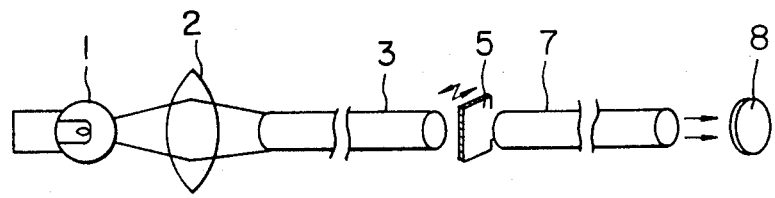
FIG. 3 is a schematic view showing a device for detecting the displacement of a measured body by means of a bundle of optical fibers (namely, a multifiber) according to the present invention.

FIG. 3 is a schematic view showing an embodiment of an optical sensor according to the present invention. In FIG. 3, reference numeral 1 designates a light source, 2 an optical element for changing light rays emitted from the light source 1 into parallel rays, namely, a lens, 5 a measured body, the displacement of whose edge is to be measured, 7 a bundle of optical fibers according to the present invention, and 8 a light receiving element for converting light guided by the bundle 7 of optical fibers into an electric signal.

Alternatively, the measured body 5 may be illuminated with a light beam having a uniform intensity, from the side of the bundle 7 of optical fibers, so that light reflected from the measured body 5 is led to the light receiving element 8 through the bundle 7 of optical fibers.

Figure 4:
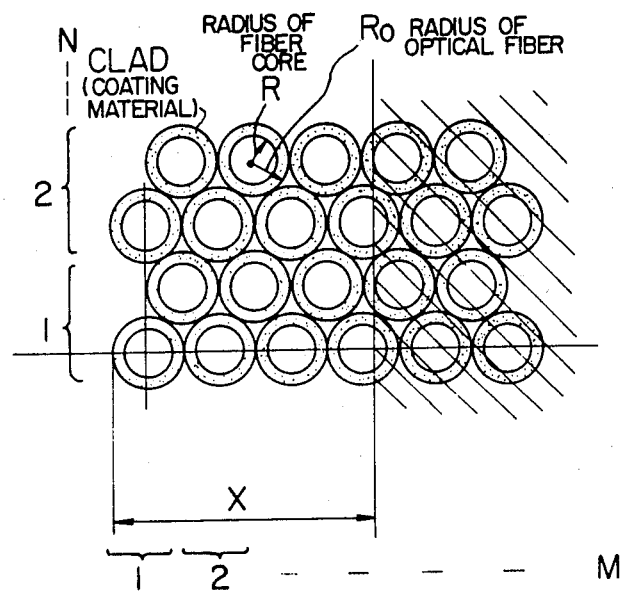
FIG. 4 shows a positional relation between the light receiving surface of a multifiber according to the present invention and an edge of a measured body.

FIG. 4 shows a multifiber which is used as the bundle 7 of optical fibers shown in FIG. 3 and is formed by stacking optical fibers each provided with a cladding layer tier upon tier in a close-packed hexagonal structure. In FIG. 4, reference character X designates the displacement of an edge of a measured body at the light receiving surface of the multifiber, M the number of optical fibers arranged in one row, N the number of double rows, $R_o$ a radius of each optical fiber, and R a radius of each fiber core.

Figure 5:
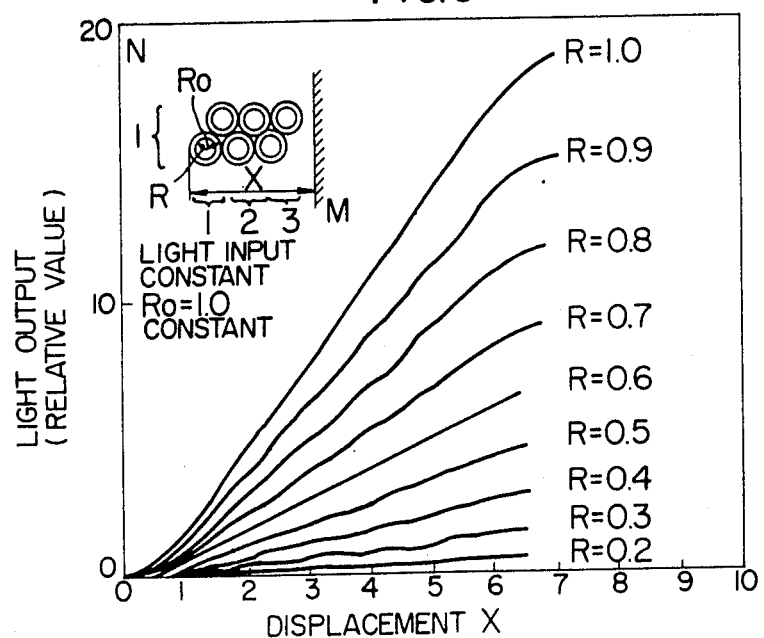
FIG. 5 shows relations between the light output from a multifiber and the displacement of a measured body for various values of the core radius of the optical fibers making up the multifiber.

FIG. 5 shows relations between the displacement X of a measured body and the light output from a multifiber which are calculated by the equation (2) for various values of the core radius R in the case where six optical fibers forming the multifiber are stacked tier upon tier in such a manner that a second row including three optical fibers is put on a first row (namely, a bottom row) including three optical fibers. It is known from FIG. 5 that the relation between the displacement X and the light output varies with the radius R of fiber core. As can been seen from FIG. 5, in the case where the light input is kept constant, the light output increases greatly with the displacement X when the core radius R is equal to 1, and the light output varies linearly with the displacement X when the core radius R is equal to 0.6.

Now, let us use an error rate $\epsilon$ as an index for indicating the linearity of variation of light output with displacement. The error rate $\epsilon$ is defined by the following equation:

$$\epsilon = \Delta Y / Yt \qquad (3)$$

where Yt indicates the light output obtained when the whole light receiving surface of a multifiber is illuminated with light, and $\Delta Y$ a difference between an actual light output Y obtained for the displacement X of a measured body and a light output obtained for the displacement X in an ideal case where the light output from the multifiber increases in a range from zero to Yt in proportion to the displacement of the measured body.

Figure 6:
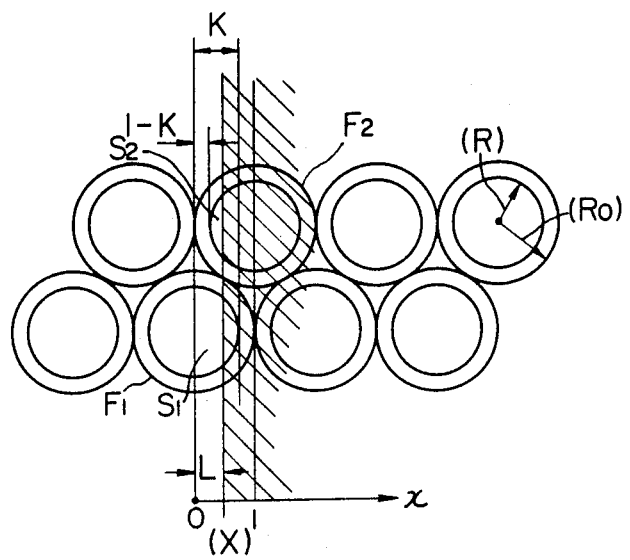
FIG. 6 is a schematic view for explaining in detail a positional relation between the light receiving surface of a multifiber and an edge of a measured body.

A method of calculating the error rate $\epsilon$ will be explained below in detail, with reference to FIG. 6. Part of optical fibers which are piled up to form a multifiber, are regularly arranged as shown in FIG. 6. Accordingly, the error rate $\epsilon$ of the whole of the multifiber can be obtained by calculating the fundamental error rate $\epsilon'$ of a given pair of optical fibers $F_1$ and $F_2$. When this fundamental error rate $\epsilon'$ is calculated, only a range from the center of the fiber $F_1$ to the center of the fiber $F_2$ at the light receiving surface of the multifiber is considered. Now, let us take the center of the fiber $F_1$ as an origin O.

Similarly to the core radius ratio $K = R/R_o$, the displacement X of a measured body at the aperture portion (that is, the light receiving surface) of the multifiber is divided by the radius $R_o$ of optical fiber, to be converted into a dimensionless quantity L given by the following equation:

$$L = X/R_o \qquad (4)$$

The quantity L is hereinafter referred to as an aperture ratio. Each of the core radius ratio K and aperture ratio L has a value less than 1 in the above-mentioned range.

When the light output from an optical fiber is proportional to the aperture area (namely, light receiving area) thereof, the fundamental error rate $\epsilon'$ indicating the linearity of variation of light output with displacement may be expressed in such a manner as indicating the linearity of variation of the aperture area of fiber core with the aperture ratio L.

The total aperture area St of fiber core in the above-mentioned range is given as follows:

$$S_t = \pi K^2 \qquad (5)$$

Accordingly, an ideal aperture area Sr of fiber core for an aperture ratio L is given as follows:

$$S_r = S_t \cdot L \qquad (6)$$

On the other hand, an actual aperture area of fiber core is given by the sum of those surface areas $S_1$ and $S_2$ of the optical fibers $F_1$ and $F_2$ which are exposed to indicate light. The light exposed surfaces $S_1$ and $S_2$ are given by the following equations:

$$S_1 = 2 \int_0^L \sqrt{K^2 - x^2}\, dx \qquad (7)$$

$$= K^2 \left\{ \sin^{-1}\left(\frac{L}{K}\right) + \frac{L}{K}\sqrt{1 - \left(\frac{L}{K}\right)^2} \right\} \text{ for } 0 \leq L \leq K$$

$$S_1 = \frac{\pi}{2} K^2 \text{ for } K < L \leq 1 \qquad (8)$$

$$S_2 = 0 \text{ for } 0 \leq L \leq 1 - K \qquad (9)$$

$$S_2 = 2 \int_{-K}^{L-1} \sqrt{K^2 - x^2}\, dx \qquad (10)$$

$$= K^2 \left\{ \frac{\pi}{2} + \sin^{-1}\left(\frac{L-1}{K}\right) + \frac{L-1}{K}\sqrt{1 - \left(\frac{L-1}{K}\right)^2} \right\}$$

for $1 - K < L \leq 1$

Using the equations (5) to (10), the fundamental error rate $\epsilon'$ is calculated by the following equation:

$$\epsilon' = \pm \left| \frac{S_1 + S_2 - S_r}{S_t} \right| \times 100 \, (\%) \quad (11)$$

Figure 7:
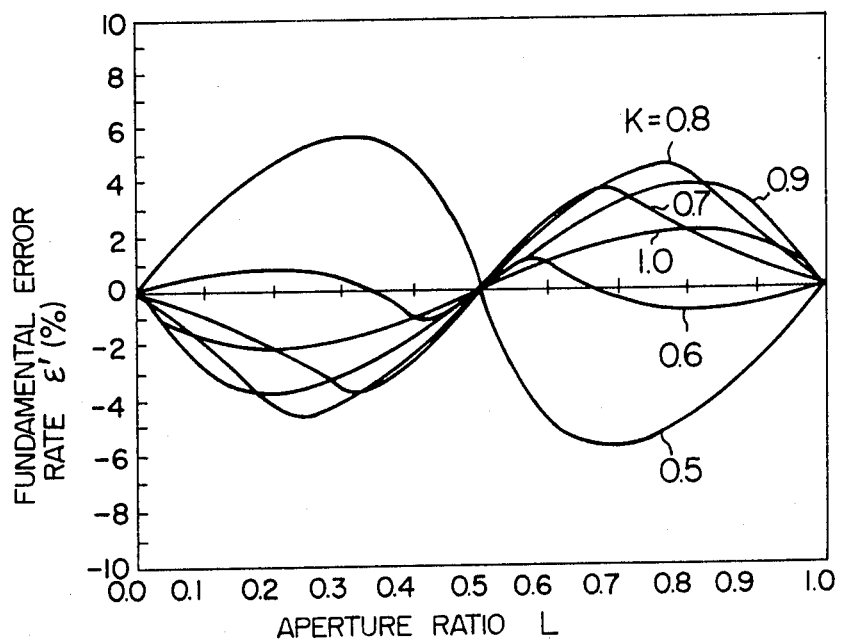
FIG. 7 is a graph showing relations between an aperture ratio L and a fundamental error rate $\epsilon'$.

The results of the above calculation are shown in FIG. 7.

Figure 8A:
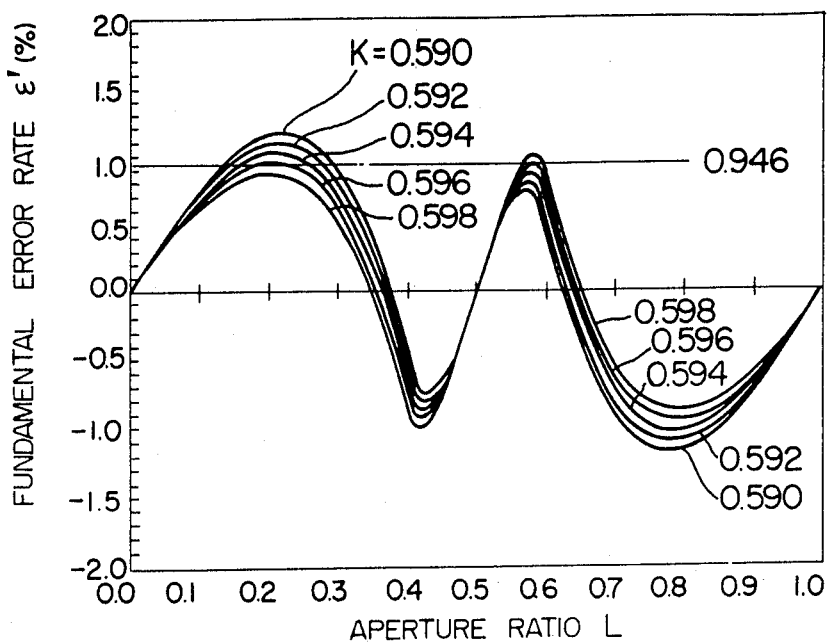
FIGS. 8a and 8b show relations between the aperture ratio L and the fundamental error rate $\epsilon'$ for determining an optimum core radius ratio.

In FIG. 7, the fundamental error rate $\epsilon'$ is indicated by a function of the aperture ratio L for each of various values of the core radius ratio K. It is desirable that the fundamental error rate $\epsilon'$ is as small as possible throughout the above-mentioned range. Now, let us determine an optimum value of the core radius ratio K in a range of the aperture ratio L from zero to 1. It is known from FIG. 8a that the optimum value of the core radius ratio K is equal to 0.596. The fundamental error rate $\epsilon'$ corresponding to the optimum value of K is nearly equal to 0.95%.

Figure 8B:
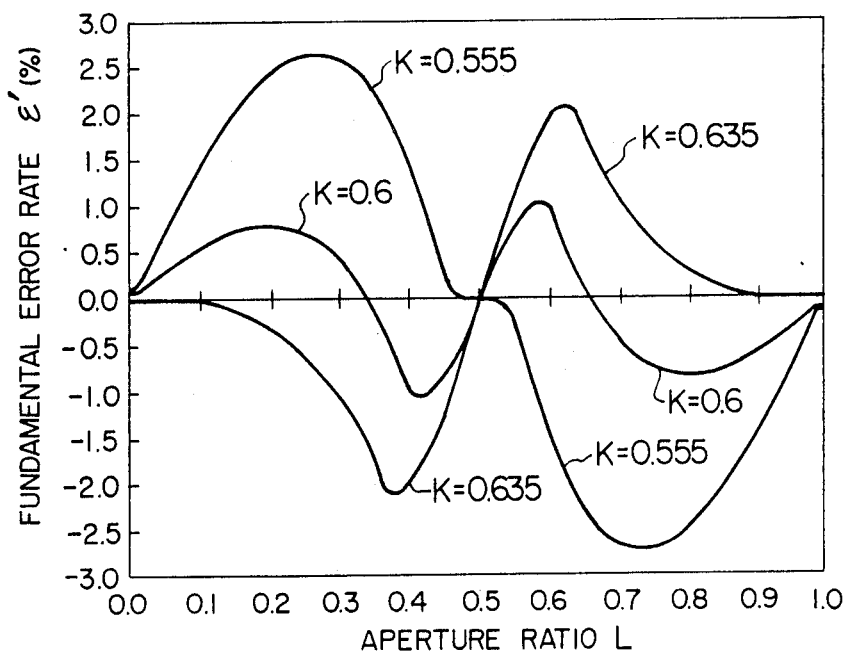

In order to obtain preferable linearity between the light output Y and the displacement X, the error rate $\epsilon'$ must be set so as to form four peaks with respect to the aperture ratio in a range of 0-1.0 as shown in FIG. 8b, that is $\epsilon'$ must be limited in a range of 2.7--−2.7%, whereby the core radius ratio K must be kept in a range of 0.55-0.65.

The error rate $\epsilon$ of a multifiber which is obtained by piling up optical fibers in such a manner that N double rows are formed and M optical fibers are arranged in each row, is independent of the number N of double rows and becomes equal to one M-th of the fundamental error rate $\epsilon'$, as indicated by the following equation:

$$\epsilon = \frac{NS_1 + NS_2 - NS_r}{NMS_t} = \frac{S_1 + S_2 - S_r}{MS_t} = \frac{\epsilon'}{M} \quad (12)$$

Incidentally, the light output from the multifiber increases as the number N of double rows is greater.

In order to make the error rate $\epsilon$ smaller than a predetermined value, it is required to make large the number M of optical fibers arranged in each row. However, when the multifiber is so designed that the fundamental error rate $\epsilon'$ becomes minimum, the number M of optical fibers in each row can be made small.

Figure 9A:
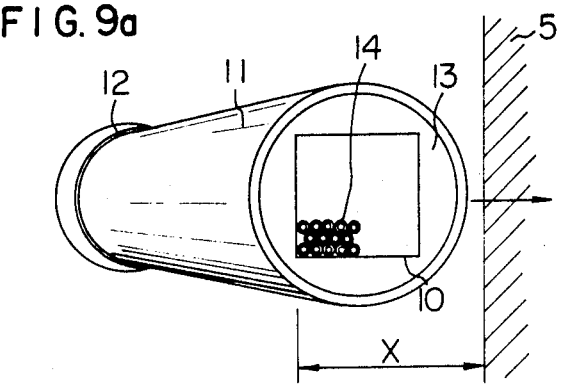
FIG. 9a is a perspective view showing an embodiment of a bundle of optical fibers (namely, a multifiber) according to the present invention and an edge of a measured body.
Figure 9B:
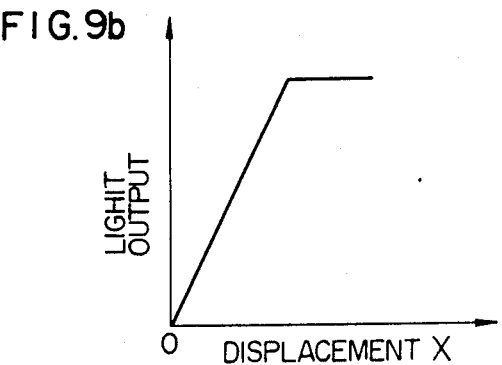
FIG. 9b is a graph showing a relation in the arrangement shown in FIG. 9a between the displacement of the measured body and the light output of the embodiment.

FIG. 9a shows an embodiment of a multifiber according to the present invention which is formed on the basis of the above-mentioned principle. Referring to FIG. 9a, light from an illuminating part (not shown) is incident upon a rectangular light receiving surface of a bundle 10 of optical fibers included in a multi-fiber 11, and then converted by a light receiving element 12 into a voltage. The bundle 10 of optical fibers is formed by stacking tier upon tier optical fibers each provided with a cladding layer, and preferably a ratio of the core radius R to the radius $R_o$ of each optical fiber is made equal to 0.596. In the present embodiment, the number M of optical fibers arranged in each row is made equal to 10, to make the error rate $\epsilon$ equal to or smaller than 0.1%. FIG. 9b shows a relation between the displacement X of a measured body disposed in front of the rectangular light receiving surface and the light output from the present embodiment. Incidentally, the light receiving element 12 may be one of a phototransistor, a photodiode, a photomultiplier and others, so long as they have predetermined performance.

Figure 10A:
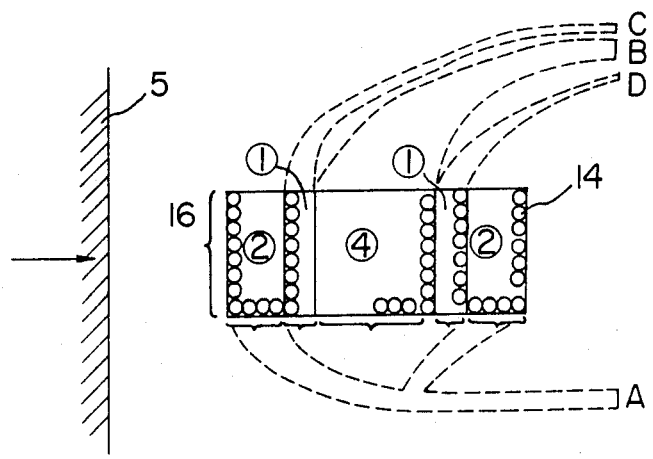
FIGS. 10a, 10b and 10c are views for explaining a device for detecting the displacement of a measured body by means of another embodiment of a bundle of optical fibers according to the present invention.
Figure 10B:
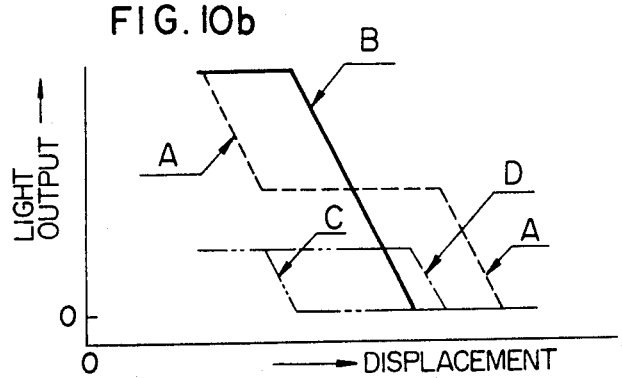
Figure 10C:
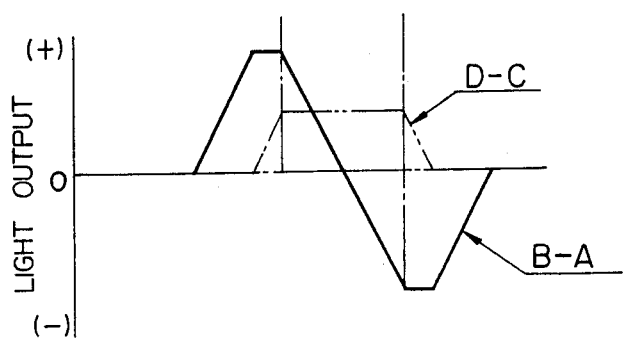

In addition to the embodiment shown in FIGS. 9a and 9b, another embodiment shown in FIGS. 10a, 10b and 10c can be used in a favorable manner. Referring to FIG. 10a, a multifiber 16 having five rectangular light receiving surfaces ①, ①, ②, ② and ④ is coupled with four light receiving elements A, B, C and D, and each of the light receiving surfaces is made up of a multiplicity of optical fibers 14 to make the light output corresponding to each light receiving surface proportional to the displacement of a measured body 5 as shown in FIG. 10b. The light receiving elements A and B are used for detecting the displacement of the measured body, and the elements C and D are used for determining a range of displacement detection. Light incident on the light receiving surfaces ② and ② occupying peripheral portions of an end face of the multifiber 16 is detected by the element A, and light incident on the light receiving surface ④ occupying a central portion of the end face is detected by the element B. A difference between the output of the element A and that of the element B is detected through the aid of a differential amplifier (not shown), and is used for determining the middle point (namely, zero point) of a displacement vs. light output curve. The above-mentioned difference is designated by reference symbol B-A in FIG. 10c. Further, a difference between the output of the element C and that of the element D is detected through the aid of another differential amplifier (not shown), and is used for judging whether an edge of the measured body 5 is present in a range between the light receiving surfaces corresponding to the elements C and D or not. This difference is indicated by reference symbol D-C in FIG. 10c. When the edge of the body 5 is present in the above-mentioned range, the displacement of the body 5 can be detected using a characteristic curve B-A shown in FIG. 10c. In the present embodiment, it is required that the number of optical fibers included in the light receiving surfaces ② and ② is equal to the number of optical fibers in the light receiving surface ④.

As has been explained in the foregoing, a multifiber according to the present invention is high in resolution, and thus can detect the displacement of a measured body with accuracies better than 0.5 μm, without being put in contact with the measured body.

Further, a displacement sensor including a multifiber according to the present invention can accurately measure the displacement of a body which is being moved or stands still, by a light transmission method or light reflection method.

We claim:

1. A bundle structure of optical fibers stacked tier upon tier in a close-packed structure for forming a light receiving surface, wherein each of said optical fibers has a core covered with a cladding layer and the ratio of a radius of a core of each optical fiber to a radius of said optical fiber including a cladding layer ranges from 0.55 to 0.65.

2. A bundle structure of optical fibers according to claim 1, wherein the optical fibers of one tier are offset with respect to the optical fibers of the adjacent tier.

3. A bundle structure of optical fibers according to claim 2, wherein the light receiving surface formed by the bundle structure of optical fibers is rectangular.

4. An optical fiber sensor for measuring displacement of a displaceable member comprising:

light guiding means having at least three bundles of optical fibers including two side bundles and a central bundle disposed therebetween for guiding light from a light source, said bundles being closely disposed to each other in side-by-side alignment, each of said bundles having optical fibers stacked tier upon tier to provide a rectangular light receiving surface disposed proximate to the displaceable member, the number of optical fibers of said two side bundles being substantially equal to the number of optical fibers of said central bundle, each of said optical fibers forming said side and central bundles having a core and a cladding layer, the ratio of a radius of said core of each optical fiber to a radius of the outer surface said optical fiber ranging from 0.55 to 0.65;

a first light sensing means for sensing light guided by the central bundle and providing an output indicative thereof;

a second light sensing means for sensing light guided by said side bundles and providing an output indicative thereof; and a differential amplifier for detecting a difference between the output from said first light sensing means and the output from said second light sensing means and providing an output indicative of the displacement of the displaceable member.

5. An optical fiber sensor according to claim 4, wherein the displaceable member is disposed proximate to the rectangular light receiving surface of said light guiding means so as to at least partially block light from the light source from being received by said light receiving surface in accordance with the position thereof.

6. An optical fiber sensor according to claim 4, wherein the displaceable member is disposed proximate to said rectangular light receiving surface of said light guiding means for reflecting light from the light source onto the rectangular light receiving surface in accordance with the position thereof.

7. A bundle of optical fibers for a displacement sensor wherein the bundle of optical fibers conduct light from a light source, which light varies in accordance with a position of a displaceable member disposed proximate to a light receiving surface of the bundle of optical fibers and moveable in a direction substantially parallel to the light receiving surface, the bundle of optical fibers being stacked in a close-packed structure and forming the light receiving surface proximate to the displaceable member, each of the optical fibers having a core covered with a cladding layer, a radius-ratio of a radius of the core of the optical fiber to a radius of the outer surface of the optical fiber being in the range of 0.55 to 0.65 for enabling the light conducted by the bundle of optical fibers to vary substantially linearly with the displacement position of the displaceable member.

8. A bundle of optical fibers according to claim 7, wherein the optical fibers are stacked tier upon tier, the optical fibers of one tier being offset with respect to the optical fibers of an adjacent tier.

9. A bundle of opitcal fibers according to claim 7, wherein the light receiving surface has a rectangular configuration.

10. A bundle of optical fibers according to claim 7, wherein the light receiving surface is an end face of the bundle of optical fibers for receiving light thereat, the bundle of optical fibers conducting the received light to an opposite end of the bundle of optical fibers, and light sensing means for receiving light from the opposite end of the bundle of optical fibers and for providing an output indicative thereof.

11. A bundle of optical fibers according to claim 7, wherein the displaceable member is disposed proximate to the light receiving surface of the bundle of optical fibers for blocking light from being recevied by the light receiving surface in accordance with the position of the displaceable member.

12. A bundle of optical fibers according to claim 7, wherein the displaceable member is disposed proximate to the light receiving surface of the bundle of optical fibers for reflecting light onto the light receiving surface in accordance with the position of the displaceable member.

13. A bundle of optical fibers according to claim 7, wherein the cladding layer is a single layer covering the core of the opticl fiber.

14. A bundle of opitcal fibers according to claim 7, wherein K is the radius-ratio of the optical fiber satisfying a value of $\epsilon$ less than a predetermined value, where:

$$|\epsilon| = \frac{N}{MN} \left| \frac{S_1 + S_2 - Sr}{St} \right| \times 100 \, [\%],$$

$|\epsilon|$ being an absolute measurement error in %,

M being the number of optical fibers in a row counted in the direction of displacement of the displaceable member, N being the number of double rows in a direction transverse to the direction of displacement of the displaceable member, $S_1$, $S_2$ are, respectively, aperture areas in adjacent optical fibers so that $$S_1 = \begin{cases} K^2 \cdot \left\{ \sin^{-1}\left(\frac{L}{K}\right) + \frac{L}{K}\sqrt{1 - \left(\frac{L}{K}\right)^2} \right\} & \text{for } 0 \leq L \leq K \\ \frac{\pi}{2} \cdot K^2 & \text{for } K < L \leq 1, \end{cases}$$

$$S_2 = \begin{cases} 0 & \text{for } 0 \leq L \leq 1 - K \\ K^2 \cdot \left\{ \frac{\pi}{2} + \sin^{-1}\left(\frac{L-1}{K}\right) + \frac{L-1}{K}\sqrt{1 - \left(\frac{L-1}{K}\right)^2} \right\} & \text{for } 1 - K < L \leq 1, \end{cases}$$

$Sr = L \cdot \pi \cdot K^2$, $St = \pi \cdot K^2$, St being the total aperture area of the optical fiber core, and Sr being an ideal aperture ratio of the optical fiber core for an aperture ratio L in the displacement direction of the displaceable member.

* * * * *